(12) United States Patent
Paquette

(10) Patent No.: US 8,194,088 B1
(45) Date of Patent: Jun. 5, 2012

(54) SELECTIVE COMPOSITE RENDERING

(75) Inventor: Michael James Paquette, Benicia, CA (US)

(73) Assignee: Apple Inc., Cupertino, CA (US)

( * ) Notice: Subject to any disclaimer, the term of this patent is extended or adjusted under 35 U.S.C. 154(b) by 891 days.

(21) Appl. No.: 11/499,107

(22) Filed: Aug. 3, 2006

(51) Int. Cl.
*G09G 5/36* (2006.01)
*G06F 13/00* (2006.01)

(52) U.S. Cl. .................. 345/545; 345/536; 345/537

(58) Field of Classification Search .............. 345/537, 345/536, 545
See application file for complete search history.

(56) References Cited

U.S. PATENT DOCUMENTS

| | | | |
|---|---|---|---|
| 7,260,820 B1 * | 8/2007 | Waldspurger et al. | 718/1 |
| 7,281,272 B1 * | 10/2007 | Rubin et al. | 726/26 |
| 2005/0097341 A1 * | 5/2005 | Francis et al. | 713/189 |
| 2007/0018992 A1 * | 1/2007 | Wong | 345/545 |

* cited by examiner

*Primary Examiner* — Hau Nguyen
(74) *Attorney, Agent, or Firm* — Fish & Richardson P.C.

(57) ABSTRACT

Systems, apparatus, methods and computer program products for rendering a graphical user interface by selectively compositing display contents are described. In general, for each of one or more content producers, where each content producer is associated with content storage containing display content, display content for output is identified depending on the content consumer to which the graphical user interface is being rendered.

25 Claims, 5 Drawing Sheets

SELECTIVE COMPOSITE RENDERING

TECHNICAL FIELD

This disclosure relates to graphical user interfaces.

BACKGROUND

Conventional graphical user interface systems are capable of rendering multiple application windows on a display space (e.g., a desktop) at a given time. A conventional graphical user interface system includes a compositor and one or more content buffers. The compositor maintains information about the visible regions of each window and its location on the display. A content buffer can be maintained for each window and include the content of the respective window. The compositor paints each window on the display according to the visible regions of each window and the underlying content maintained in the respective content buffers. When a region of the display requires updating (e.g., window movement, window resizing or content updating), the compositor assembles new content for the affected region by combining content from all the content buffers that contribute content to the region.

Compositors can be used to render the content for a variety of displays including various output display devices, display content recorders (e.g., screen capture) or other systems or components for various purposes (e.g., for the purposes of remote control by for example the Apple Remote Desktop).

SUMMARY

Systems, apparatus, methods and computer program products are described below for rendering a graphical user interface by selectively compositing display contents. In one implementation, in general for each of one or more content producers, where each content producer is associated with content storage containing display content and optionally alternative display content, display content for output is identified depending on the content consumer to which the graphical user interface is being rendered.

In one aspect a method is provided that includes identifying a content producer associated with a plurality of content buffers, each buffer having display content and each buffer associated with a respective content consumer of a plurality of content consumers. In response to a presentation request identifying a first content consumer, the method includes identifying a content buffer in the plurality of content buffers based on the identified first content consumer; and presenting the display content from the identified content buffer to the first content consumer.

One or more implementations can optionally include one or more of the following features. Presenting can include compositing the display content with other display content, the other display content associated with one or more other content producers. The presentation request can identify the content producer. The method can include preventing access to the composited buffer content except to the first content consumer. The method can include identifying a content transformer; and transforming display contents of the content buffer with the identified content transformer. The content transformer can be associated with a content buffer. The content transformer can be associated with a content producer. Transforming the contents of the protected buffer can include one or more of: down-sampling; blurring; scaling; re-colorization; and watermarking. A content consumer can be a class of devices including a plurality of output devices. A content producer can be a class of devices including a plurality of input devices.

In another aspect a method is provided that includes identifying first content for display in a first display environment; identifying alternative content related to the first content and for display in a second display environment; receiving a request to display the first content in the second display environment; and displaying the alternative content in lieu of the first content in the second display environment.

In another aspect a method is provided that includes identifying one or more content buffers including at least one protected content buffer, the protected content buffer including a property defining a restriction on rendering the content included in the protected content buffer; receiving a request for rendering of content associated with the one or more content buffers; determining if the restriction is violated; if the condition is violated, compositing the one or more content buffers except the protected content buffer; and rendering the composited content.

One or more implementations can optionally include one or more of the following features. Compositing the one or more content buffers can include identifying alternative content; and using the alternative content in lieu of the content from the protected content buffer. The method can include identifying the property of the protected content buffer based on a content source associated with the protected content buffer. The content source can provide one or more of image or video content. The property defining a restriction on rendering can include encryption keys. Determining if the restriction is violated can include facilitating exchange of encryption keys between a content producer and a content presenter, the content producer providing content to the protected content buffer, the content consumer receiving the composited content.

In another aspect a method is provided that includes associating a primary content buffer with a secondary content buffer; associating the primary content buffer with one or more first output devices; associating the secondary content buffer with one or more second output devices; and selectively provisioning the primary content buffer contents or the secondary content buffer contents for presentation, the provisioning being contingent on a selected output device.

In another aspect a method is provided that includes specifying a property associated with content to be displayed on one or more output devices, such that the property determines whether the content provided by an input device is subject to transformation when displayed on a selected output device.

One or more implementations can optionally include one or more of the following features. The input device can be a content producer. The output device can be a content consumer.

In another aspect a method is provided that includes identifying a first buffer that includes content; determining which display environment the content is to be displayed in from among a plurality of possible display environments; and if the display environment is unsecured, displaying alternative content when a request to display the first buffer's content is received.

One or more implementations can optionally include one or more of the following features. Displaying alternative content can include identifying a second buffer containing the alternative content. Displaying alternative content can include transforming the content included in the first buffer.

In another aspect a method is provided that includes providing identifying information associated with an output display environment to a content provider; requesting content from the content provider, the content for display in the output display environment; and receiving a variation of content from the content provider for display in the output display environment based on the identifying information.

One or more implementations can optionally include one or more of the following features. Receiving a variation of content can include matching the identifying information with restrictions associated with the content provider.

Particular implementations of these aspects can realize one or more of the following advantages. A content producer can provide display content without the provided display content being presented or captured by an undesirable content consumer. Content producers can provide display content that is automatically transformed when presented to particular content consumers. A content producer can provide display contents to a particular display device, a class of display devices or display devices with a particular characteristic without the content producer being required to receive or process information about the particular display device on which the display contents are actually rendered.

The details of one or more implementations are set forth in the accompanying drawings and the description below. Other features will be apparent from the description, the drawings, and the claims.

DESCRIPTION OF DRAWINGS

Like reference numbers and designation in the various drawings indicate like elements.

DETAILED DESCRIPTION

Figure 1:
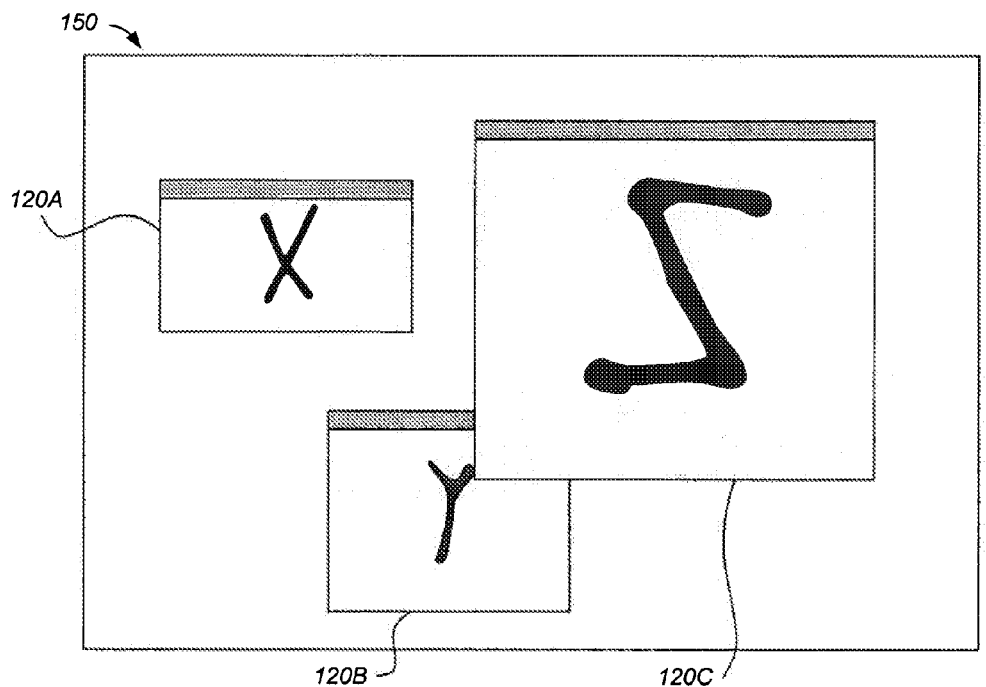
FIG. 1 is a diagram of an exemplary graphical user interface.
Figure 1:
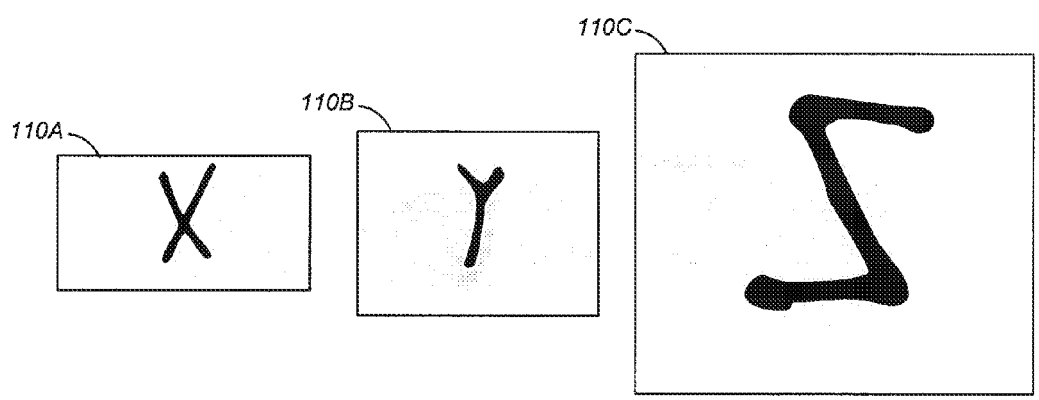

FIG. 1 is an illustration of a rendered graphical user interface 150. In general, a rendered graphical user interface presents display contents 110 (e.g., a user interface) associated with one or more windows. In FIG. 1, the display contents 110A, 110B, 110C of three separate windows are individually depicted. Typically, graphical user interfaces allow multiple windows 120 to be displayed concurrently (e.g., windows 120A, 120B, and 120C). When the graphical user interface is rendered, each window 120 contains and depicts the window's respective display content. Each window 120 has geometry referring to the window's shape, size, position, and order with respect to other windows. For example, the window 120A is smaller in size (e.g., width and height) than window 120C, and window 120A is in a different position than window 120C. Generally, windows can overlap. The order of a window determines whether the window overlaps or is overlapped by other windows. For example, window 120C partially overlaps the window 120B and obscures part of the content within window 120B. Rendering the graphical user interface 150 includes compositing the display contents 110 of each window 120 according to the shape, size, position and order of each window. When the display contents 110 of a window are updated, or the geometry of a window 120 is updated (moved, repositioned, or resized), the graphical user interface 150 is rendered to reflect those changes.

Generally, the graphical user interface 150 can be rendered to a content consumer. The content consumer can be a display environment or a display device capable of visually displaying content, typically to a user (e.g., computer monitor, built-in screen, LCD display, portable display device, etc.). Multiple display devices can be used to present content concurrently. In some implementations, multiple display devices can present the same content (e.g., display mirroring). For example, a laptop can present display contents on its built-in display and can present the same display contents an attached display (e.g., a projector, external CRT device, etc.). In some implementations, a content consumer can be a secured content consumer that can receive content while ideally protecting the content from subsequent capture or recording. For example, the laptop's built-in display can be secured while the attached display may not be secured. As described below in reference to FIG. 2 and FIG. 3, some display content (e.g., protected content) should be presented only on the secured display device, while alternative content, if any, is presented on the unsecured display device.

In some implementations the display environment rendering the graphical user interface can include transferring and optionally encoding a representation of the graphical user interface over a network for display on a remote display device. For example, the graphical user interface can be displayed on a remote computer to allow remote control of the graphical user interface (e.g., Remote Desktop from Apple Inc. of Cupertino, Calif.). In such implementations, the display environment is remote from the rendering of the graphical user interface.

In some implementations, a content consumer can include one or more tools (e.g., applications) that capture or record content. For example, an application can capture a screenshot depicting, at one particular point in time, the rendered graphical user interface. In another example, an application can record the rendered graphical user interface 150 as the rendering is updated over time.

Figure 2:
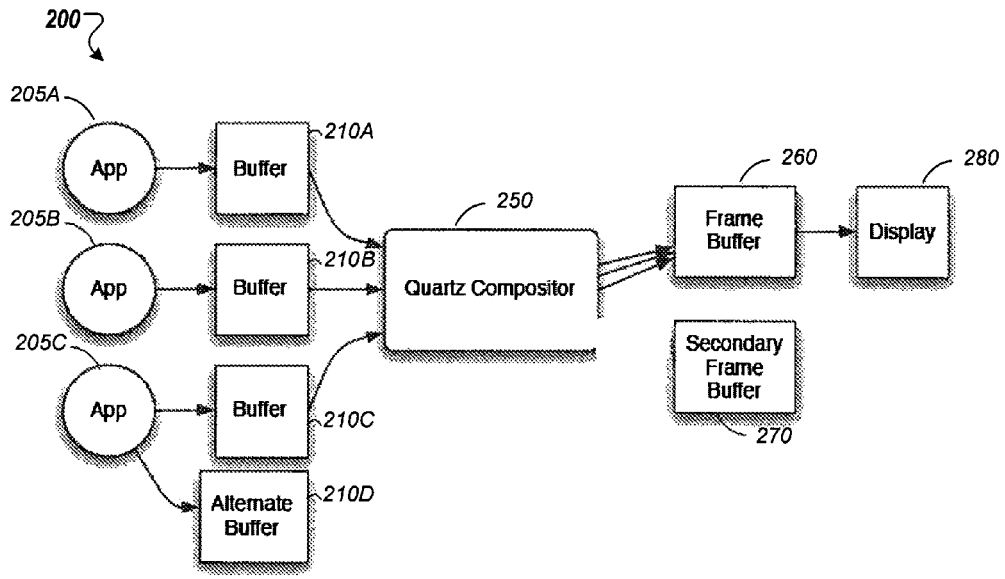
FIG. 2 is a block diagram of an exemplary system that can be used for compositing one or more content buffers into a primary frame buffer.

FIG. 2 is a block diagram of an exemplary system 200 for securing content to be displayed on a display device. The system 200 includes a plurality of content producers that provide display content (e.g., applications 205A-C). Typically, each content producer is associated with a window (e.g., window 120A in FIG. 1). In one implementation, each content buffer 210, and associated content producer 205 has characteristics (e.g., width, height, shape position, etc.) that reflect the geometry of the window associated with the content producer.

Each content producer 205 is associated with a content buffer 210. Although separate content buffers 210A-D are shown, other structures are possible including one or more shared buffers. The particular memory structure can vary among implementations. A content producer 205 can store its display contents to the content producer's one or more associated content buffers 210. For example, application 205A can store a user interface, which can include a dialog box with buttons and input boxes, in the content buffer 210A.

In some implementations, a content producer can store display contents into the content buffer (e.g., writing a raster of pixels into the content buffer). In other implementations, the content producer uses a graphical subsystem (e.g., a GUI toolkit, OpenGL, etc.) to generate display contents into the content buffer. Still other content producers provide a stream of display contents (e.g., a multimedia video stream). For example, an application 205B for playing movies can store one or more frames of a movie in the content buffer 210B.

A particular content buffer 210 can be created, associated or dedicated for use by a given content producer or by the system as required by the particular system implementation. Typically, a content producer 205 can render into or access content buffers 210 that the content producer is associated with. In some implementations, a content buffer 210 of one content producer 205 is not accessible by the other content producers. For example, application 205B may not be able to access either the other content buffers 210A and 210C.

A compositor 250 renders the graphical user interface, which includes the display contents associated with each content producer, for display or capture. The compositor 250 renders the graphical user interface (e.g., the graphical user interface 150 illustrated in FIG. 1) by compositing the display contents from one or more content buffers 210 associated with each content producer. Compositing each application's display contents includes rendering all or part of the display content from the content producer's content buffer 210 according to the geometry of each content producer's window. For example, if the geometry of a window indicates that it is partially occluded by an overlapping window, then only the visible portion of the window's display contents are rendered.

The graphical user interface is rendered to a content consumer. Typically the content consumer is a display device, such as display device 280, which can include a frame buffer 260. The frame buffer 260 is generally an area of memory that contains the information to be displayed on the display device 280 (e.g., a raster of pixels or a display list of visual elements). Generally, the size of the frame buffer is proportional to the display device. In some implementations, if there is more than one display device, multiple frame buffers can each be associated with each of the display devices. Alternatively, a single frame buffer can be associated with more than one display device and each associated display device can display a portion of the content in the frame buffer. Other combinations of frame buffers and associated displays are possible.

The graphical user interface can be rendered to multiple content consumers. Each content consumer can be distinct from the other. For example, the graphical user interface can be rendered into a primary display device, a secondary display, a capture device and a remote display.

In FIG. 2, for example, one content consumer is a display device 280 associated with a frame buffer for presentation of the graphical user interface to a user. The display device 280 can be designated as the primary content consumer. The secondary frame buffer 270 is a content consumer that captures and records the graphical user interface. In general, the graphical user interface can be rendered to many content consumers, each of which have different characteristics and functionality (e.g., various secured and unsecured display devices including remote display devices, capture tools, etc.). For example, the graphical user interface can be rendered to a primary frame buffer for presentation on a primary display, to a secondary buffer for presentation on a secondary display device and to another secondary buffer for remote display.

Generally, each content producer 205 stores display content in each of the content buffers 210 associated with the content producer. At least one of the content buffers associated with the content producer is a primary content buffer (e.g., content buffer 210C), containing the content producer's normal, or ideal, display contents. One or more of the other content buffers associated with a content producer can be designated as an alternative buffer (e.g., content buffer 210D). Alternative display contents of the content producer can be stored in the alternative content buffer 210D. In one implementation, alternative display content is generally representative of the display content in the primary content buffer. For example, alternative display content can be display content that has been down-sampled from display content contained in the primary buffer. In some implementations, alternative display content can also be unrelated to the display contents stored in the primary buffer (e.g., text, an icon, image, etc.).

When rendering to a particular content consumer, a content buffer is identified for each content producer. The identified content buffers are used to render the graphical user interface to the particular content consumer. If a content producer has only a single content buffer (e.g., application 205A and 205B), the single content buffer can be used to render the graphical user interface regardless of the content consumer.

For example, in FIG. 2 the graphical user interface is shown being rendered, by the compositor 250, into frame buffer 260 (e.g., indicated by the arrows pointing from the compositor 250 to the frame buffer 260), which is attached to a display device 280. Display contents for each content producer, applications 205A-C, are identified. Application 205A and 205B are associated with only a single primary content buffer 210A and 210B, respectively. Thus, buffers 210A and 210B are identified for rendering the display contents of applications 205A and 205B respectively. Application 205C is associated with two content buffers. To render display contents from application 205C, one of the content buffers is identified. When rendering to the primary content producer, content buffer 210C is identified since content buffer 210C is designated as the primary content buffer.

Figure 3:
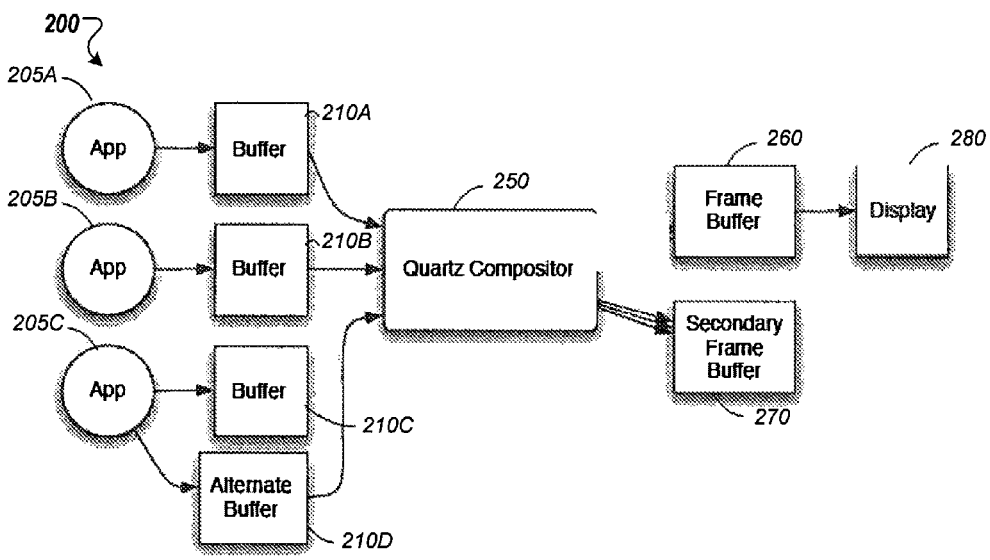
FIG. 3 is a block diagram of an exemplary system for compositing content buffers into a secondary frame buffer.

FIG. 3 is a block diagram of the exemplary system 200 where the graphical user interface is rendered to a secondary frame buffer 270. Again, content buffers for each content producer are identified including both primary and alternative content buffers (e.g., alternative content buffer 210D).

Compare the alternative pathways depicted in FIG. 2 and FIG. 3. In FIG. 2 each content producer's primary content buffer (e.g., buffer 210A-C) is used to render the graphical user interface into the primary content consumer (e.g., frame buffer 260). In FIG. 3 the alternative content buffer (e.g., buffer 210D) of each content producer is used, when available, to render into the secondary content consumer (e.g., secondary frame buffer 270).

In some implementations, access to frame buffers, or more generally reading display content back from a content consumer, can be protected from unauthorized access. For example, the frame buffer can be in protected memory or mapped to protected memory. Protected memory is memory that can only be read by system processes that have sufficient authority (e.g., the operating system or privileged daemon, application or process). Limiting access to the frame buffers prevents unauthorized access to potentially protected display contents and thus prevents unauthorized copying or capture of content.

Figure 4:
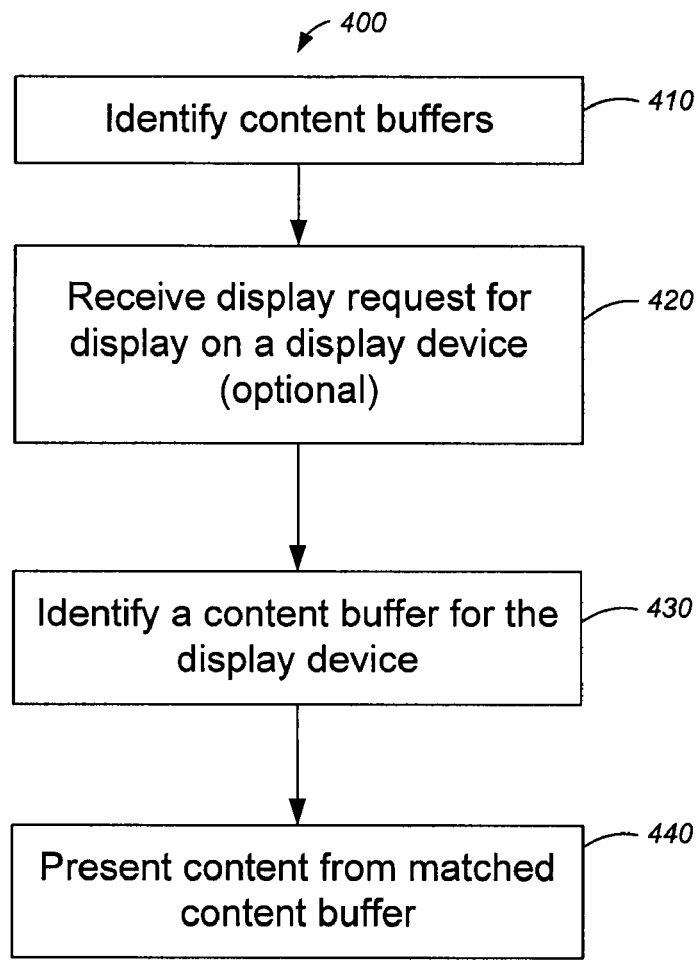
FIG. 4 is a flow chart of a technique for determining which content buffers of a content producer to render into a particular content consumer.

FIG. 4 is a flow diagram for a method 400 for determining which content buffers of a content producer to render to a particular content consumer. Method 400 includes identifying content buffers for each content producer (step 410). Identifying content buffers can include identifying a content producer's content buffers. Identified content buffers can include buffers that are designated as primary and alternative content buffers. Identifying content buffers can include creating the buffer or requesting and receiving a buffer from another process or entity (e.g., the operating system, an application, the compositor).

Optionally, a display request can be received (step 420). The display request identifies a content consumer into which the graphical user interface should be rendered. The identified content consumer (e.g., display device) can be one of many content consumers to which the graphical user interface can be rendered. Receiving the display request can also include receiving information related to the identified content consumers (e.g., whether the content consumer is secured, remote, etc.).

Alternatively, the graphical user interface can be rendered to an identified display device on a predetermined basis. For example, the graphical user interface can be rendered repeatedly to the primary device and only to secondary devices as requested. In another example, the graphical user interface can be rendered to multiple content consumers repeatedly or at regular intervals in a round-robin fashion. Other implementations are possible.

In response to receiving a display request and identifying a content consumer, the method 400 includes identifying content buffers associated with the identified content consumer (step 430). Generally at least one content buffer can be identified for each content consumer. In one implementation the identification of content buffers can be based on pre-determined associations between content buffers and content consumers. For example, both content buffers and content consumer can be designated as either primary or secondary. The pre-determined associations can be used to identify a content producer's primary content buffers when rendering to primary content consumers. The same pre-determined associations can be used to identify content producer's secondary content buffers when rendering to secondary content consumers.

In another implementation each content buffer can be associated with any of: one or more content consumer, one or more classes of content consumers and one or more content consumer characteristics. For each content producer, a content buffer is identified with associations that match the content consumer to which the graphical user interface is being rendered to. For example, a content buffer can be associated with secured content consumers indicating that the content buffer's contents are only eligible for rendering to secured content consumers.

In such an implementation, the compositor, or a process acting on behalf of the compositor, can be interrogated to identify content consumers that the compositor is currently, or could potentially, render to. Content buffers can be associated with one or more of the identified content consumers. For example, the first content buffer can be associated with primary display device and a second content buffer can be associated to a remote display device. The associations between content buffers and content consumers are used to identify a content buffer while rendering to a particular content consumer. For example, the compositor identifies the first buffer associated with the primary display while rendering to the primary display and identifies the second content buffer while rendering to the remote display device.

In yet another implementation, rather than identify a pre-existing content buffer, display contents contained within a content producer's content buffer can be transformed while rendering to particular devices. Transforming the display contents can include identifying an intermediary, transient or temporary content buffer to which the transformed display contents can be stored. In some implementations display content can be transformed while rendering (e.g., on the fly) the graphical user interface to the content consumer.

Transformations can include down-sampling display content, replacing the display contents with static content or predetermined content. For example, particular content transformations can include adding a watermark to the content, superimposing a text or image over the content, altering the content's color space (e.g., to black and white, to sepia tones, etc.), or scaling (e.g., smaller or larger), pixilating, blurring, or deforming the content. Other transformations are possible.

A content buffer can be associated a particular content consumer (e.g., secured) and to particular transformations (e.g., down-sampling). These associations can, for example, indicate that when rendering the buffer's display contents to any content consumer except a secured display device, the display contents in be transformed (e.g., down-sampled). When rendering to an unsecured display device, the transformed display contents from content buffer are used while compositing the graphical user interface.

The method 400 includes presenting the graphical user interface on the identified display device (step 440). Presenting the graphical user interface includes compositing the display contents in the content buffers identified for each content consumer into a rendering of the graphical user interface. In general, the display content of each identified content buffer is rendered according to the window geometry associated with each content producer (e.g., the window in which the display contents are being depicted in).

In some implementations, if a content buffer cannot be identified for a particular content producer, then the display contents, and the associated window, can simply be omitted from the rendering of the graphical user interface. For example, if, for a particular content producer, only a single content buffer is specified and the content buffer is associated with a primary display device, then while rendering to a secondary display device, the window's contents or the entire window can simply be omitted from the presentation. Alternatively, if a content buffer cannot be identified, predetermined content can be rendered when no other content can be identified (e.g., a rendering of the text "Content Restricted"). The predetermined content can be based on a default setting, user preferences or a system parameter.

Figure 5:
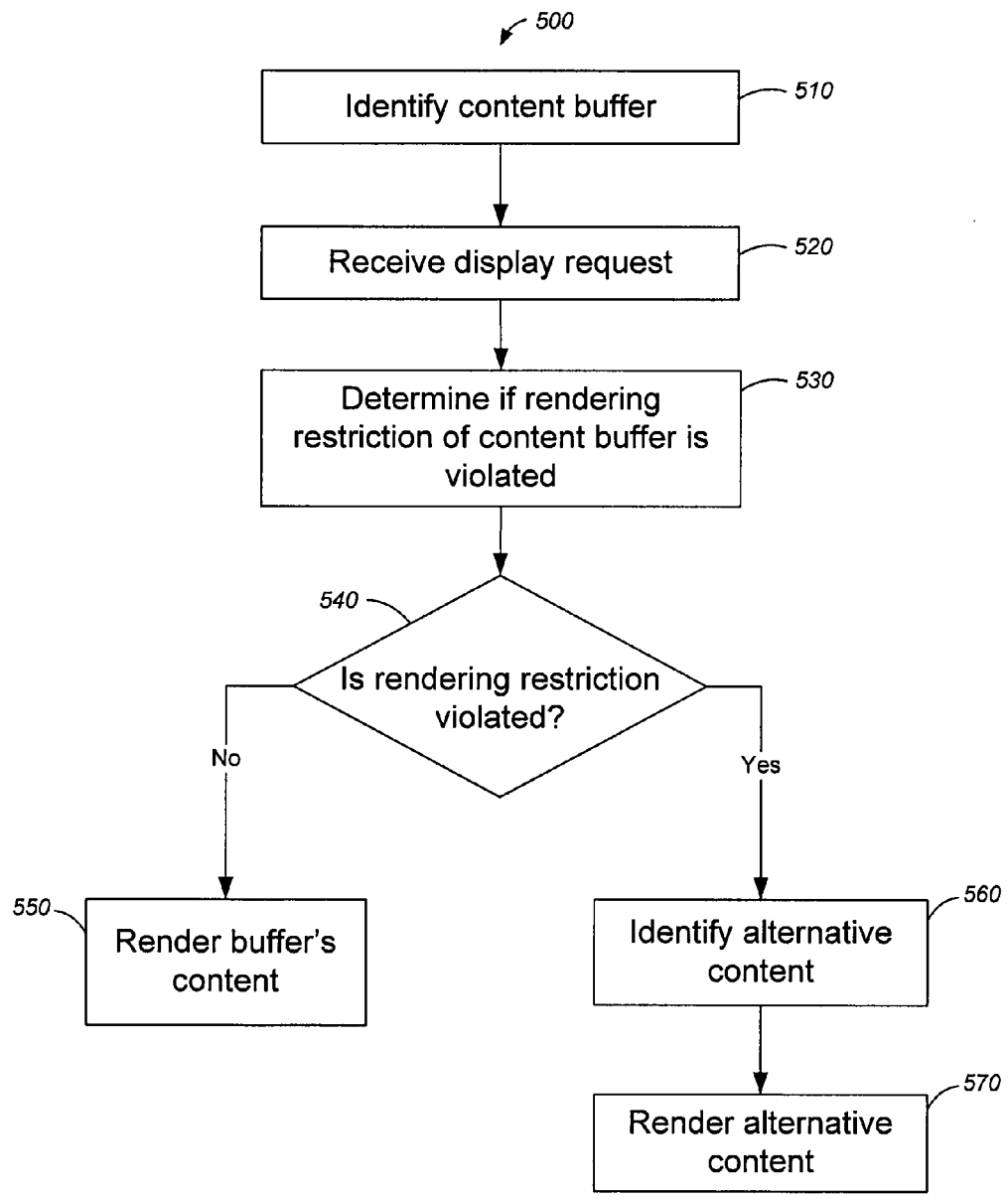
FIG. 5. is a is a flow diagram for a technique for determining whether a content buffer restriction has been violated.

FIG. 5 is a flow diagram for a method 500 for determining whether a content buffer restriction has been violated. The method 500 includes identifying content buffers (step 510) and receiving a display request from a content consumer (step 520). Both steps are analogous to identically named steps described above in association with FIG. 4 (e.g., step 410 and step 420). In contrast, each identified content buffer can be associated with one or more rendering restrictions. A content buffer's rendering restrictions can include properties that indicate which content consumers can receive a rendering that includes the content buffer's display contents. For example, the rendering restrictions can include identifications of one or more content consumers to which the display contents of the content buffer can be provided. Alternatively the identifications can identify content consumers to which the display contents should not be provided. The rendering restrictions can indicate a class or property of the content consumer that must be satisfied. Rendering restrictions can also indicate where alternative content can be identified. The alternative content can be used for rendering to content consumers for which one or more of the rendering restrictions are violated.

In one implementation, the rendering restrictions of a content buffer can depend on, or be set based on, the particular display contents provided by the content producer. For example, an application for viewing images can set varying content restrictions on content buffers depending on the image that the application is presenting. Protected content can, for example, contain attending meta-data that provides an indication that the content only be displayed on a particular device or class of device (e.g., a secure device). The image viewing application can use the indications from the protected image to set the content restrictions of the content buffer.

More generally, protected content can also include content that is subject to digital rights management (DRM). A content producer can provide protected content in the primary content buffer and designate that the primary content buffer only be used if the content consumer satisfies DRM conditions. The same content producer can render alternative content into a secondary content buffer that is designated for rendering on all other content consumers that do not satisfy the DRM conditions.

Method 500 includes determining whether or not any of the rendering restrictions associated with the content buffer are violated (step 530). The determination is based on the buffer's rendering restrictions and the content consumer that is receiving the rendering (e.g., determined in step 520). In some implementations, the content consumer, class of content consumer or property of content consumer referred to by the rendering restrictions can be matched with known properties of the content consumer.

In one implementation, aspects of the content producer can affect the rendering restrictions of content buffers associated with the content producer. For example, the display contents of an unsigned application may not be allowed to have display contents rendered to particular content consumers. An unsigned application is an application that has not been endorsed or certified by a trusted authority. Identifying rendering restrictions based on the content producer, can be made according to pre-defined system policies and, or properties of the content producer and the content consumer. For example, a content producer providing a DVD stream of display content can be associated with properties that affect the rendering restrictions of the associated content buffer (e.g., to render only to content consumers that have a 'region' property of a particular value).

In other implementations, determining whether rendering restrictions associated with a content buffer have been violated can include additional steps. For example, implementations that support digital rights management can facilitate the exchange of keys between the content producer and the content consumer. For example, in an implementation that supports High-Bandwidth Digital Content Protection (HDCP), the exchange of the Key Selection Vectors (KSV), System Renewability Messages (SRM) and related data can be facilitated between a content consumer (e.g., HDCP-enabled display device) and content producer (e.g., Blu-Ray DVD drive and/or Blu-Ray DVD player application). Facilitation can include providing a communication path between the content consumer and the content producer through which the key exchange and SRM updates may be done. If, for example, the content consumer and, or content producer determine that the particular display content is inappropriate (e.g., the display device is a non-HDCP-enabled display and the content includes a set Image Constraint Token (ICT) flag), then a rendering restriction can be added to the content buffer. The restriction can indicate that alternative display content be presented on that display.

In another implementation, the identity of a content source can be verified, as by digital signature verification. Verification of the content source can include retrieving a key (e.g., from a Transaction Processing Module containing keys and KSVs). The key can be used (e.g., exchanged, SRM updates, etc) on behalf of the verified application to facilitate DRM (e.g., authentication, key exchange, verification, etc.) between the content source and a content producer.

If the rendering restriction is not violated (step 540), then the display contents in the content buffer can be composited into the graphical user interface and rendered to the identified content consumer (step 550).

Alternatively, if the rendering restriction is violated (step 540), then alternative content can be identified in lieu of the display contents of the content buffer for which the restriction is violated. Identifying alternative content can include, identifying an associated buffer (e.g., containing alternative display contents) whose rendering restrictions are not violated. Alternatively, alternative content can be identified by transforming the content (e.g., down sampling, re-colorizing, etc.) or by using pre-determined content (e.g., a static text rendered message or icon). The alternative content can be used to render the graphical user interface to the identified content consumer (step 570).

In another implementation, a content consumer can have properties that indicate the nature of the content consumer's content display capabilities. Capabilities can include, for example, the device's security level (e.g., DRM security), trust level (e.g., of the remote display device), and the content consumer's capacity to display graphical content (e.g., maximum resolution, maximum bandwidth, color space, refresh rate, etc.). The properties of the content consumers can be used to determine whether to render alternative content to the particular content consumer. For example, display contents in a content buffer can be automatically transformed according to the properties of the content consumer (e.g., hiding the display contents of an application for which the device's trust level is insufficient). In another implementation, if the restriction is violated the content consumer's secondary buffer (e.g., containing low-fidelity display contents) can be used during rendering instead.

Figure 6:
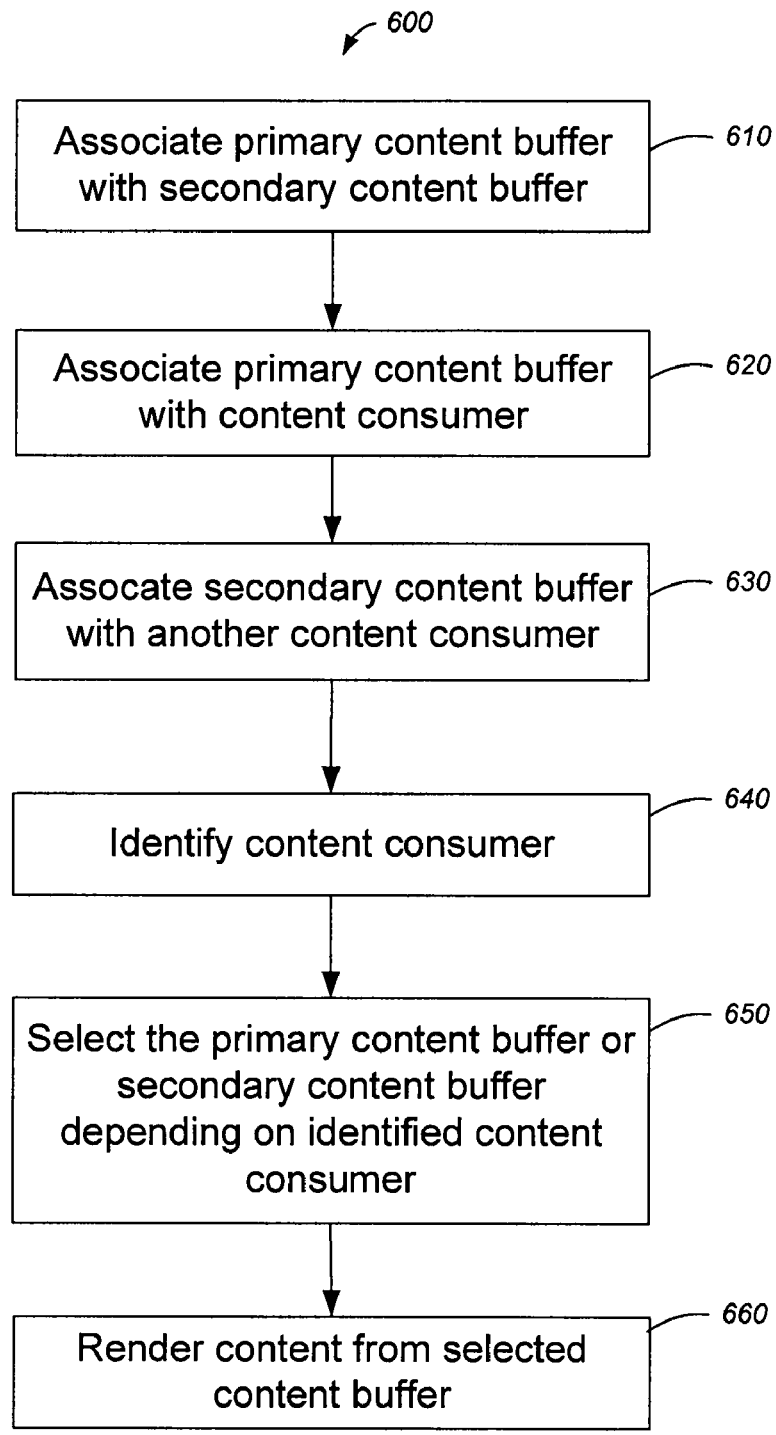
FIG. 6 is a flow diagram of a technique for selecting between two associated content buffers based on their respective association to content consumers.

FIG. 6 is a flow diagram of a method 600 for selecting between two associated content buffers based on their respective association to content consumers. The method 600 includes associating the content buffer of a content producer with another content buffer (step 610). One of the buffers can be designated as the primary content buffer, the other as the secondary content buffer. Both the primary content buffer (step 620) and secondary content buffer (step 630) can be associated with a particular content consumer. Generally, the content consumer associated with the primary content buffer is different from the content consumer associated with the secondary content buffer. Alternatively, each of the content buffers can be associated with a unique class of content consumers or mutually exclusive content consumer properties (e.g., protected and non-protected).

The method 600 includes identifying a content consumer (step 640). For example, the content consumer can be identified from a request made by the content consumer. The identified content consumer is one of the content consumers associated with the primary or secondary content buffer.

Based on the identified content consumer, either the primary content buffer or the secondary content buffer is identified (step 650). A content buffer is identified according to which of the content consumers associated with the content buffer matches the identified content consumer. The display contents of the selected content buffer are rendered to the identified content consumer.

Embodiments of the invention and all of the functional operations described in this specification can be implemented in digital electronic circuitry, or in computer software, firmware, or hardware, including the structures disclosed in this specification and their structural equivalents, or in combinations of one or more of them. Embodiments of the invention can be implemented as one or more computer program products, i.e., one or more modules of computer program instructions encoded on a computer readable medium for execution by, or to control the operation of, data processing apparatus. The computer readable medium can be a machine readable storage device, a machine readable storage substrate, a memory device, a composition of matter effecting a machine readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD ROM disks. The processor and the memory can be supplemented by, or incorporated in, special purpose logic circuitry.

To provide for interaction with a user, embodiments of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the invention can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the invention, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. For example, the actions recited in the claims can be performed in a different order and still achieve desirable results.

What is claimed is:

1. A method comprising:
   receiving primary content and alternative content from a content producer for rendering at a content consumer, the content producer being a hardware or software source of the primary and alternative content, the content consumer being a device operable to present the primary or alternative content, wherein the content consumer is associated with a frame buffer, the frame buffer being a memory device protected from unauthorized access;
   storing the primary content in a primary buffer and the alternative content in an alternative buffer, each of the primary buffer content and alternative buffer content being different from the frame buffer, at least one of the primary buffer or alternative buffer being associated with a rendering restriction, the rendering restriction specifying a condition for choosing content for rendering at the content consumer, wherein, based upon whether the condition is satisfied, either the primary content or the alternative content is selected for rendering;
   receiving a content request identifying the content consumer, the content request specifying a property of the content consumer;
   based on the rendering restriction and the property of the content consumer, triggering a selection of either the primary buffer or the alternative buffer as a source of the content to be rendered; and
   based on the selection, providing either the primary content in the primary buffer or the alternative content in the alternative buffer to the frame buffer of the content consumer for rendering.

2. The method of claim 1, where providing the primary content or alternative content for rendering comprises:
   compositing the content from the selected buffer with other content, where the other content is from one or more other content producers and is stored in a buffer that is different from the primary buffer, the alternative buffer, or the frame buffer.

3. The method of claim 1, where the content request further identifies the content producer.

4. The method of claim 1, further comprising:
   preventing access to the primary content by the content consumer based on the rendering restriction and the property of the content consumer if the alternative buffer is selected.

5. The method of claim 1, further comprising:
   identifying a content transformer; and
   transforming the primary content in the primary buffer into the alternative content using the identified content transformer.

6. The method of claim 5, where the content transformer is associated with the primary buffer.

7. The method of claim 5, where the content transformer is associated with the content producer.

8. The method of claim 5, where transforming the primary content of the primary buffer comprises one or more of:
   down-sampling;
   blurring;
   scaling;
   re-colorization; or
   watermarking.

9. The method of claim 1, where the content consumer is an output device.

10. The method of claim 1, where the content producer is an input device or an application program.

11. The method of claim 1, where the content consumer is one of a display device or an application that captures display content.

12. A computer program product, encoded on a computer-readable storage device, operable to cause a data processing apparatus to perform operations comprising:
   receiving primary content and alternative content from a content producer for rendering at a content consumer, the content producer being a hardware or software source of the primary and alternative content, the content consumer being a device operable to present the primary or alternative content, wherein the content consumer is associated with a frame buffer, the frame buffer being a memory device protected from unauthorized access;
   storing the primary content in a primary buffer and the alternative content in an alternative buffer, each of the primary buffer content and alternative buffer content being different from the frame buffer, at least one of the primary buffer or alternative buffer being associated with a rendering restriction, the rendering restriction specifying a condition for choosing content for rendering at the content consumer, wherein, based upon whether the condition is satisfied, either the primary content or the alternative content is selected for rendering;
   receiving a content request identifying the content consumer, the content request specifying a property of the content consumer;
   based on the rendering restriction and the property of the content consumer, triggering a selection of either the primary buffer or the alternative buffer as a source of the content to be rendered;
   and
   based on the selection, providing either the primary content in the primary buffer or the alternative content in the alternative buffer to the frame buffer of the content consumer for rendering.

13. The computer program product of claim 12, where providing the primary or alternative content for rendering comprises:
   compositing the content from the selected buffer with other content, where the other content is from one or more other content producers and is stored in a buffer that is different from the primary buffer, the alternative buffer, or the frame buffer.

14. The computer program product of claim 12, where the content request further identifies the content producer.

15. The computer program product of claim 12, the operations further comprising preventing access to the primary content by the content consumer based on the rendering restriction if the alternative buffer is selected.

16. The computer program product of claim 12, the operations further comprising:
   identifying a content transformer; and
   transforming the primary content in the primary buffer into the alternative content using the identified content transformer.

17. The computer program product of claim 12, where transforming the primary content of the primary buffer comprises one or more of:
   down-sampling;
   blurring;

scaling;
re-colorization; or
watermarking.

18. A system comprising:
means for receiving primary content and alternative content from a content producer for rendering at a content consumer, the content producer being a hardware or software source of the primary and alternative content, the content consumer being a device operable to present the primary or alternative content, wherein the content consumer is associated with a frame buffer, the frame buffer being a memory device protected from unauthorized access;
means for storing the primary content in a primary buffer and the alternative content in an alternative buffer, each of the primary buffer content and alternative buffer content being different from the frame buffer, at least one of the primary buffer or alternative buffer being associated with a rendering restriction, the rendering restriction specifying a condition for choosing content for rendering at the content consumer, wherein, based upon whether the condition is satisfied, either the primary content or the alternative content is selected for rendering;
means for receiving a content request identifying the content consumer, the content request specifying a property of the content consumer;
means for, based on the rendering restriction and the property of the content consumer, triggering a selection of either the primary buffer or the alternative buffer as a source of the content to be rendered; and
means for providing, based on the selection, either the primary content in the primary buffer or the alternative content in the alternative buffer to the frame buffer of the content consumer for rendering.

19. A system, comprising:
one or more computers configured to perform operations including:
receiving primary content and alternative content from a content producer for rendering at a content consumer, the content producer being a hardware or software source of the primary and alternative content, the content consumer being a device operable to present the primary or alternative content, wherein the content consumer is associated with a frame buffer, the frame buffer being a memory device protected from unauthorized access;
storing the primary content in a primary buffer and the alternative content in an alternative buffer, each of the primary buffer content and alternative buffer content being different from the frame buffer, at least one of the primary buffer or alternative buffer being associated with a rendering restriction, the rendering restriction specifying a condition for choosing content for rendering at the content consumer, wherein, based upon whether the condition is satisfied, either the primary content or the alternative content is selected for rendering;
receiving a content request identifying the content consumer, the content request specifying a property of the content consumer;
based on the rendering restriction and the property of the content consumer, triggering a selection of either the primary buffer or the alternative buffer as a source of the content to be rendered; and
based on the selection, providing either the primary content in the primary buffer or the alternative content in the alternative buffer to the frame buffer of the content consumer for rendering.

20. The system of claim 19, where providing the primary content or alternative content for rendering comprises:
compositing the content from the selected buffer with other content, where the other content is from one or more other content producers and is stored in a buffer that is different from the primary buffer, the alternative buffer, or the frame buffer.

21. The system of claim 19, where the content request further identifies the content producer.

22. The system of claim 19, the operations further comprising preventing access to the primary content by the content consumer based on the rendering restriction if the alternative buffer is selected.

23. The system of claim 19, the operations further comprising:
identifying a content transformer; and
transforming the primary content in the primary buffer into the alternative content using the identified content transformer.

24. The system of claim 19, where the content consumer is an output device.

25. The system of claim 19, where the content producer is an input device or an application program.

* * * * *